United States Patent Office 3,129,913
Patented Apr. 21, 1964

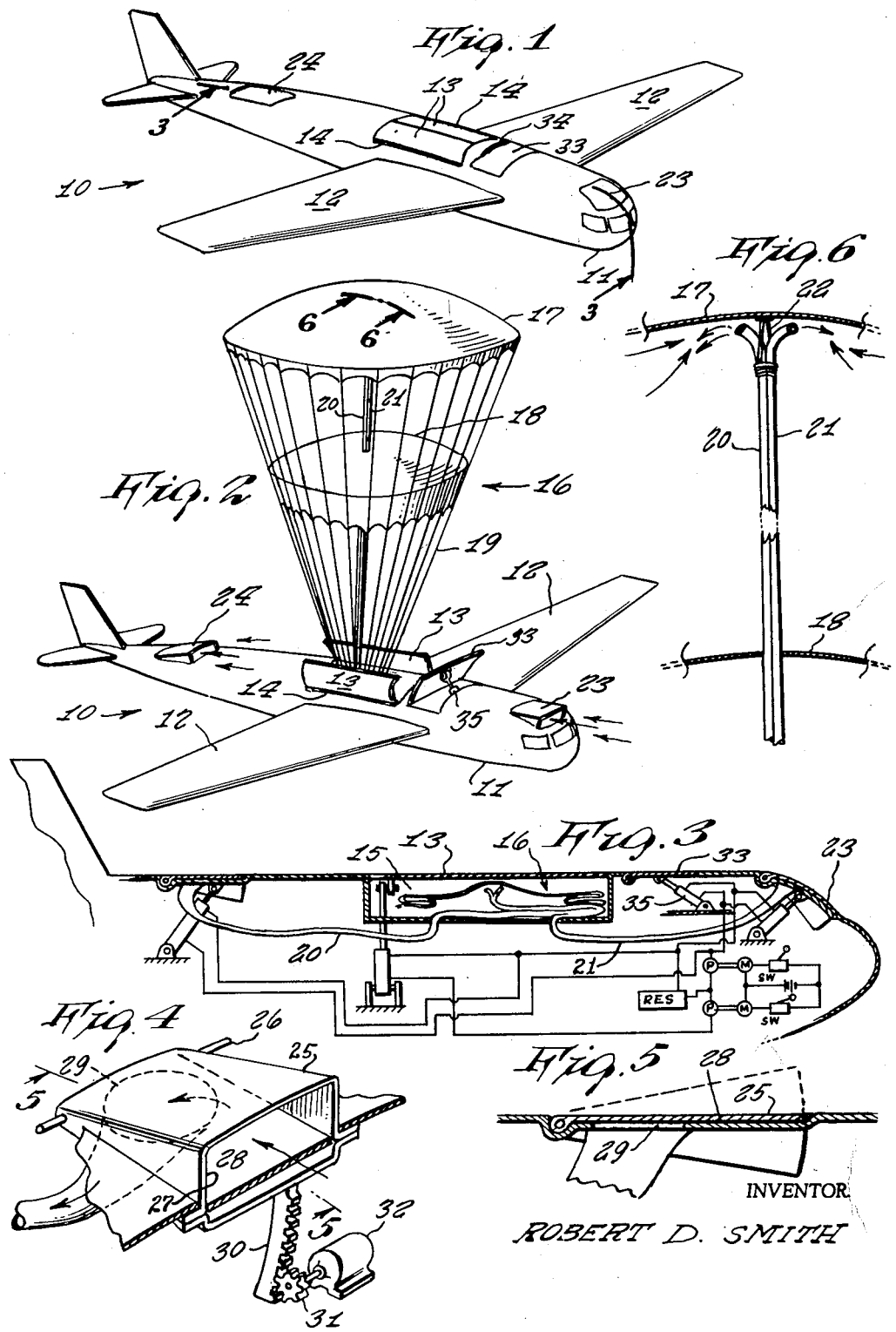

3,129,913
AIRCRAFT PARACHUTE
Robert D. Smith, 2742 E. Tremont Ave., Bronx 61, N.Y.
Filed Dec. 24, 1962, Ser. No. 246,702
1 Claim. (Cl. 244—139)

This invention relates generally to airplane safety equipment. More specifically it is related to parachute mechanisms for airplanes.

One object of the present invention is to provide an improved parachute for airplanes and a self-contained parachute launching mechanism.

Another object of the present invention is to provide an airplane parachute which will slow down the rate of fall of a disabled airplane thereby preventing destruction of the craft and loss of lives upon impact with the ground.

Yet another object of the present invention is to provide an airplane parachute which can be placed from a stored inoperative position to an inflated operative position within only a relatively few seconds.

Still another object is to provide an airplane parachute which can be placed into operative position by depressing a simple control switch.

Other objects are to provide an airplane parachute and parachute launching mechanism which is light in weight, will not take up excessive space, is positive to work, and which is efficient in operation.

Other objects may be readily apparent upon a detailed study of the following specification and the accompanying drawing wherein:

FIGURE 1 is a perspective view of an airplane incorporating the invention shown in inoperative position.

FIGURE 2 is a similar view showing the parachute in operative position.

FIGURE 3 is a cross sectional view taken on line 3—3 of FIGURE 1.

FIGURE 4 is an enlarged perspective view of one of the air scoops.

FIGURE 5 is a cross sectional view through 5—5 of FIGURE 4, and

FIGURE 6 is an enlarged cross sectional view through 6—6 of FIGURE 2.

Referring now to the drawing in detail, the numeral 10 represents an airplane according to the present invention wherein there is a fuselage 11 having wings 12. In the upper side of the fuselage there are a pair of doors 13 attached by hinges 14 to the fuselage. These doors provide access to a compartment 15 within which there is housed a parachute assembly 16 in folded collapsed position, which comprises a canopy 17, a canopy 18, shrouds 19 and a pair of air hoses 20 and 21. The shrouds are attached to the framework of the airplane.

The hoses are attached by means of strap 22 to the underside of canopy 17, the hoses then extending through the apex of canopy 18 as shown in FIGURES 2 and 6. One of the hoses is connected to an air scoop 23 at the forward end of the airplane and the other hose is connected to an air scoop 24 at the rear.

Each air scoop is comprised of an inverted trough 25 pivoted at its rear edge on shaft 26 and having a mouth 27 at its forward edge. Each air scoop is movable between a streamlined position adjacent the fuselage to an outwardly extended position into the air stream, as shown in FIGURES 4 and 5. A depressed area 28 is made on the fuselage to accommodate the scoop in streamlined retracted position. A large round opening 29 in the depressed area connects to one of the hoses.

An arcuate gear rack 30 is attached to each scoop and a gear 31 driven by motor 32 is engaged therewith.

An air shield 33 attached at its rear edge by a hinge 34 to the top of the fuselage immediately forward of doors 13 is operated between a streamlined position adjacent the fuselage as shown in FIGURE 1, to an outwardly extended position as shown in FIGURE 2, by means of a hydraulic piston 35.

In operative use, when a state of emergency occurs such that the airplane is in danger of crashing to earth, the pilot simply depresses a singular control button which causes the following several operations at same instance. Doors 13 are opened, the air shield 33 and air scoops 23 and 24 are pushed into the air stream. The air shield protects the rush of air into the compartment 15 and ruffling up the parachutes. The air scoops immediately force air into the hoses and under canopy 17 causing it to be lifted out of the fuselage. Once it is in the air stream away from the fuselage, it will blossom fully open and draw out canopy 18 into the airstream.

It is to be noted that the air from the hoses will rush under the center of canopy 17 whereas free air from the open atmosphere will rush under the peripheral edges of the canopy, these two bodies of air rushing at each other in a violent turbulent motion causing a high pressure area to be thus quickly developed to instantly lift the canopy.

While various changes may be made on the detail construction, it shall be understood that such changes will be limited within the structure as defined by the scope of the appended claim.

What I claim as new and desire to secure by Letters Patent of the United States is:

In an airplane having a fuselage and airfoils, the combination of a compartment within said fuselage, sideward opening access doors to said compartment, said doors being on the upper side of said fuselage, a parachute assembly retained in folded position within said compartment, means for opening said doors, means for shielding inflow of outer air into said compartment when said doors are opened, and means for delivering a quantity of air to said parachute assembly in said compartment, said means for shielding comprising a shield on the upper side of said fuselage adjacent the forward edge of said access doors, a hinge on the rear edge of said shield affixed to said fuselage and a hydraulic piston affixed between said fuselage and the forward portion of said shield, said means for opening said doors comprising a singular control switch which simultaneously operates said shield piston and said means for delivering a quantity of air, said means for delivering a quantity of air comprising a plurality of air scoops on the upper side of said fuselage, and air hoses between said scoops and said parachute assembly, said parachute assembly comprising a plurality of canopies in alignment one over the other in spaced apart relationship, shrouds between said canopies and said fuselage, and said air hoses extending through the apex of the lower of said canopies to the underside of the upper of said canopies, the terminal ends of said hoses being open and attached to the apex of said upper canopy.

References Cited in the file of this patent
UNITED STATES PATENTS

| | | |
|---|---|---|
| 1,692,108 | Bergmann | Nov. 20, 1928 |
| 2,324,045 | Vallinos | July 13, 1943 |
| 2,455,044 | Caplan | Nov. 30, 1948 |